United States Patent
Yun et al.

(10) Patent No.: US 11,628,631 B2
(45) Date of Patent: Apr. 18, 2023

(54) WELDING STRUCTURE OF T-TYPE WELDING JOINT

(71) Applicants: HYUNDAI MOTOR COMPANY, Seoul (KR); KIA MOTORS CORPORATION, Seoul (KR); Hwashin Co., Ltd., Yeongcheon-si (KR)

(72) Inventors: Young Dong Yun, Hwaseong-si (KR); Yong Min Jang, Gyeongsan-si (KR)

(73) Assignees: HYUNDAI MOTOR COMPANY, Seoul (KR); KIA MOTORS CORPORATION, Seoul (KR); HWASHIN CO., LTD., Yeongcheon-si (KR)

( * ) Notice: Subject to any disclaimer, the term of this patent is extended or adjusted under 35 U.S.C. 154(b) by 358 days.

(21) Appl. No.: 17/071,199

(22) Filed: Oct. 15, 2020

(65) Prior Publication Data

US 2021/0299972 A1    Sep. 30, 2021

(30) Foreign Application Priority Data

Mar. 31, 2020 (KR) .................. 10-2020-0039164

(51) Int. Cl.
*B32B 7/00* (2019.01)
*B29C 65/00* (2006.01)

(52) U.S. Cl.
CPC .... *B29C 66/43441* (2013.01); *B29C 66/1122* (2013.01); *B29C 66/20* (2013.01); *B32B 7/00* (2013.01)

(58) Field of Classification Search
None
See application file for complete search history.

(56) References Cited

FOREIGN PATENT DOCUMENTS

| DE | 10061309 A1 * | 6/2002 | ........... B23K 1/0008 |
|---|---|---|---|
| KR | 10-2015-0046222 A | 4/2015 | |
| KR | 10-2017-0097228 A | 8/2017 | |
| KR | 10-2017-0105116 A | 9/2017 | |
| KR | 10-2018-0019214 A | 2/2018 | |
| WO | WO-2015166149 A1 * | 11/2015 | ........... B23K 33/008 |

OTHER PUBLICATIONS

Machine translation of WO2015/166149A1 (Year: 2022).*
English abstract of DE10061309A1 (Year: 2022).*

* cited by examiner

*Primary Examiner* — Alexander S Thomas
(74) *Attorney, Agent, or Firm* — Morgan, Lewis & Bockius LLP (57) ABSTRACT

A welding structure of a T-shape welding joint in which a second base material is welded in a T-shape to a first base material may include the first base material including a first flat portion, a second flat portion, and curved portions formed between the first flat portion and the second flat portion; the second base material in which a bent portion is formed at an end of a main body portion such that the bent portion is disposed to face the curved portions of the first base material; and a bead disposed between the curved portions of the first base material and the bent portion of the second base material.

9 Claims, 8 Drawing Sheets

WELDING STRUCTURE OF T-TYPE WELDING JOINT

CROSS REFERENCE TO RELATED APPLICATION

The present application claims priority to Korean Patent Application No. 10-2020-0039164, filed Mar. 31, 2020, the entire contents of which is incorporated herein for all purposes by this reference.

BACKGROUND OF THE INVENTION

Field of the Invention

The present invention relates to a welding structure of a T-shape welding joint, and more particularly, to a welding structure of a T-shape welding joint capable of relieving stress concentration in a welded area to increase durability.

Description of Related Art

In general, a vehicle body is made by welding and assembling various panels.

Welding is frequently used for making the vehicle body light and highly strong.

Various methods of welding are applied depending on properties and shapes of base materials to be welded. One of the most typical welding methods is T-shape welding by which the base materials are disposed with respect to each other in a T shape.

Figure 1:
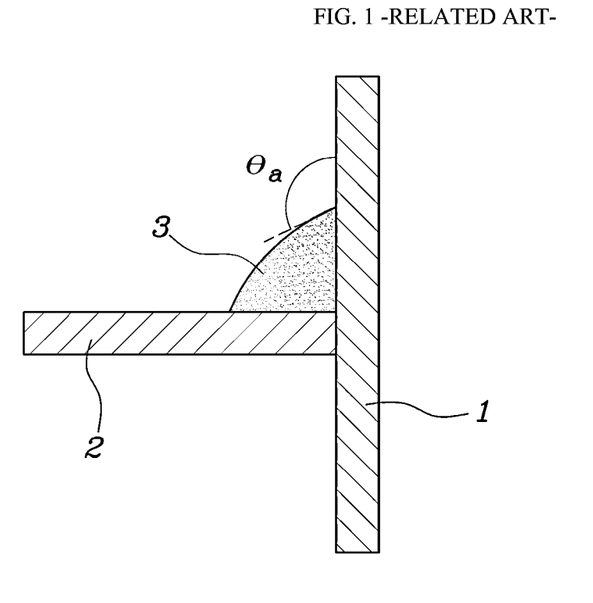
FIG. 1 and FIG. 2 are views illustrating general T-shape welding structures.
Figure 2:
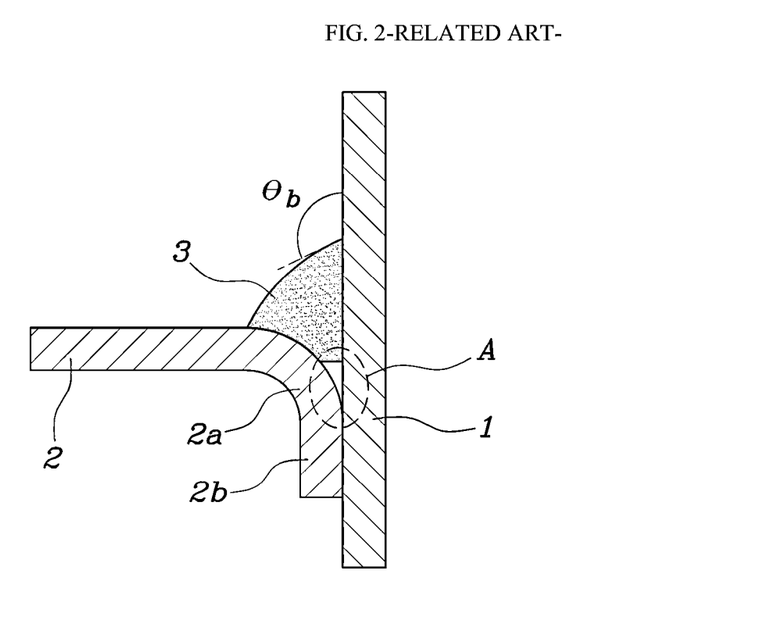

FIG. 1 and FIG. 2 are views illustrating general T-shape welding structures. FIG. 1 illustrates T-shape flat welding and FIG. 2 illustrates flare bevel welding.

In FIG. 1 and FIG. 2, both of which illustrate a method in which a second base material 2 disposed in a direction perpendicular to a gravitational direction is welded in a T-shape to a first base material 1 disposed in the gravitational direction, and a bead 3 is formed by welding an area where a side surface of the first base material 1 is in contact with an upper portion of the second base material 2 on the basis of the gravitational direction. In the instant case, for the flare bevel welding illustrated in FIG. 2, an end portion of the second base material 2 is bent in a "¬" shape to form a bent portion 2a and a vertical portion 2b.

Meanwhile, for both types of welding illustrated in FIG. 1 and FIG. 2, the first base material 1 is formed in a straight line along the gravitational direction. Due to the present shape, the bead 3 formed between the first base material 1 and the second base material 2 has a relatively small toe angle θa or θb with respect to the first base material 1. The reason why the toe angle θa or θb of the bead 3 with respect to the first base material 1 is small is that molten metal for welding sags downwardly under the influence of gravity.

Furthermore, as illustrated in FIG. 2, when the flare bevel welding is performed, the molten metal is not introduced into a root portion, and thus, there may be a non-welded root portion A where the bead 3 is not formed.

When the toe angle θa or θb is small or the non-welded root portion A occurs as described above, stress may be concentrated on that area, and thus, a fracture may occur.

The information disclosed in this Background of the present invention section is only for enhancement of understanding of the general background of the present invention and may not be taken as an acknowledgement or any form of suggestion that this information forms the prior art already known to a person skilled in the art.

BRIEF SUMMARY

Various aspects of the present invention are directed to providing a welding structure of a T-shape welding joint configured for relieving stress concentration in a welded area to increase durability.

According to various exemplary embodiments of the present invention, a welding structure of a T-shape welding joint in which a second base material is welded in a T-shape to a first base material includes: the first base material including a first flat portion, a second flat portion, and curved portions formed between the first flat portion and the second flat portion; the second base material in which a bent portion is formed at an end of a main body portion such that the bent portion is disposed to face the curved portions of the first base material; and a bead disposed between the curved portions of the first base material and the bent portion of the second base material.

The first base material may be disposed along a gravitational direction, the second base material may be disposed in a direction perpendicular to the gravitational direction, and the bent portion of the second base material may be bent downwardly on the basis of the gravitational direction.

The second base material may have a vertical portion formed from an end of the bent portion to be parallel to the first base material, the first flat portion of the first base material may meet the vertical portion of the second base material, the second flat portion may extend above the first flat portion with the curved portions intervening therebetween, and the first flat portion and the second flat portion may be formed in parallel to each other while being spaced from each other by a predetermined offset amount u.

The offset amount u and a thickness t of the first base material may satisfy the following Relational Expression 1:

$$u \geq 0.3 \times t. \quad \text{[Relational Expression 1]}$$

The curved portions formed in the first base material may be divided into: a first curved portion extending while being curved from the first flat portion at a first curvature R1; a second curved portion extending and connected to the second flat portion while being curved from the first curved portion at a second curvature R2.

The first curvature R1 of the first curved portion and the second curvature R2 of the second curved portion may satisfy the following Relational Expressions 2 and 3, respectively, in relation to a thickness t of the first base material:

$$R1 \geq 2 \times t \quad \text{[Relational Expression 2]}$$

$$R2 \geq t. \quad \text{[Relational Expression 3]}$$

The first curved portion may be curved to be convex toward the second base material, and the second curved portion may be curved to be concave toward the second base material.

The methods and apparatuses of the present invention have other features and advantages which will be apparent from or are set forth in more detail in the accompanying drawings, which are incorporated herein, and the following Detailed Description, which together serve to explain certain principles of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Hereinafter, embodiments of the present invention will be described in more detail with reference to the accompanying drawings. However, the present invention is not limited to the exemplary embodiments included below but may be implemented in variously different forms. The exemplary embodiments are provided only to complete the present invention and for those skilled in the art to fully understand the scope of the present invention. Throughout the drawings, like reference numerals are used to denote like elements.

Figure 3:
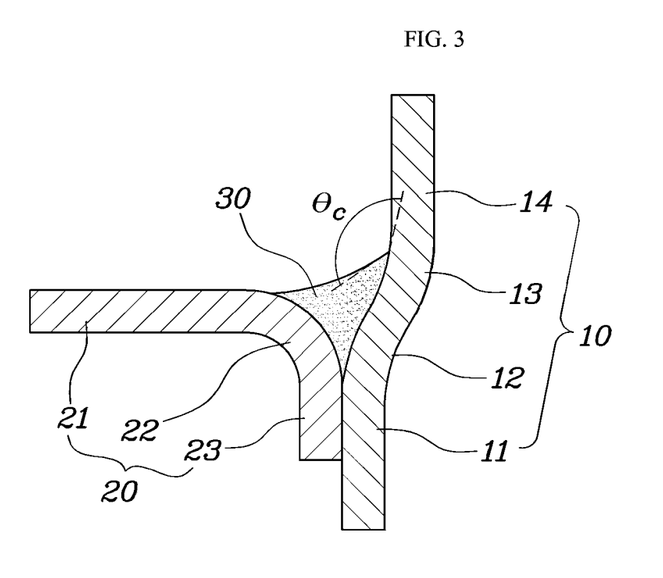
FIG. 3 is a view exemplarily illustrating a welding structure of T-shape welding joint according to various exemplary embodiments of the present invention.
Figure 4:
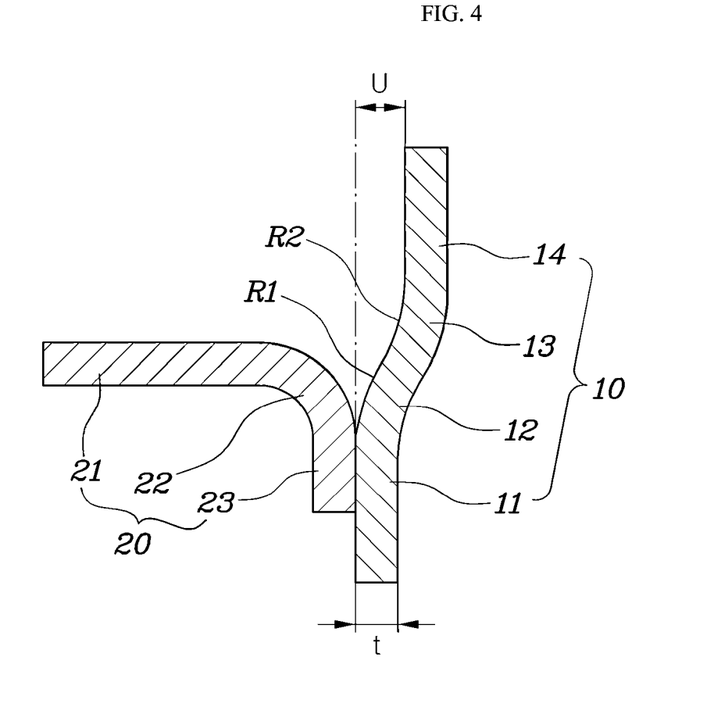
FIG. 4 is a view exemplarily illustrating the structure and arrangement of a first base material and a second base material according to various exemplary embodiments of the present invention.

FIG. 3 is a view exemplarily illustrating a welding structure of a T-shape welding joint according to various exemplary embodiments of the present invention, and FIG. 4 is a view exemplarily illustrating the structure and the arrangement of a first base material and a second base material according to various exemplary embodiments of the present invention.

As illustrated in FIG. 3 and FIG. 4, the welding structure of the T-shape welding joint in which a second base material is welded in a T-shape to a first base material according to various exemplary embodiments of the present invention includes: the first base material 10 in which curved portions 12 and 13 are formed between a first flat portion 11 and a second flat portion 14; the second base material 20 in which a bent portion 22 is formed at an end portion of a main body portion 21 such that the bent portion 22 faces the curved portions 12 and 13 of the first base material 10; and a bead 30 formed between the curved portions 12 and 13 of the first base material 10 and the bent portion 22 of the second base material 20.

In the instant case, a variety of weldable plate materials may be applied as the first base material 10 and the second base material 20, regardless of types of materials. For example, a plate material formed of steel, aluminum (Al), magnesium (Mg), or titanium (Ti) may be applied.

Meanwhile, the curved portions 12 and 13 are formed in the first base material 10 by press molding before welding, so that molten metal is gathered well while flowing into a gravitational direction during welding.

In more detail, the first base material 10 is vertically disposed in the gravitational direction. In the instant case, the first base material 10 is divided into the first flat portion 11, the curved portions 12 and 13, and the second flat portion 14, beginning from a lower side thereof. Furthermore, the first curved portion 12 and the second curved portion 13 have different curvatures from each other.

Thus, the first base material 10 includes the first flat portion 11, the first curved portion 12, the second curved portion 13, and the second flat portion 14, beginning from the lower side thereof.

Meanwhile, the curved portions 12 and 13 formed in the first base material 10 include: the first curved portion 12 extending while being curved from the first flat portion 11 at a first curvature R1; and the second curved portion 13 extending and connected to the second flat portion 14 while being curved from the first curved portion 12 at a second curvature R2.

In the instant case, the first curved portion 12 is curved to be convex toward the second base material 20, and the second curved portion 13 is curved to be concave toward the second base material 20. Accordingly, the first curved portion 12 and the second curved portion 13 are connected to each other, for example, in an approximately "S" shape.

Furthermore, in the first base material 10, the first flat portion 11 and the second flat portion 14 are formed in parallel to each other while being spaced from each other by an offset amount (u) due to the formation of the first curved portion 12 and the second curved portion 13. Thus, the first flat portion 11 and the second flat portion 14 extend with the first curved portion 12 and the second curved portion 13 intervening therebetween.

Meanwhile, the second base material 20 is disposed in a direction perpendicular to the gravitational direction thereof. Thus, the second base material 20 is in contact with the first base material 10 in a perpendicular direction thereof.

In the instant case, an end portion of the second base material 20 is bent downwardly on the basis of the gravitational direction to form the bent portion 22 and a vertical portion 23. Here, the second base material 20 is bent in an approximately "¬" shape such that the vertical portion 23 is formed to be parallel to the first base material 10.

Meanwhile, in various exemplary embodiments of the present invention, the first flat portion 11 and the second flat portion 14 of the first base material 10 being formed in parallel to each other, and the first flat portion 11 of the first base material 10 and the vertical portion 23 of the second base material 20 being formed in parallel to each other are not limited to mean that they are exactly parallel to each other, but may mean that the first flat portion 11, the second flat portion 14, and the vertical portion 23 are formed relatively parallel to each other, although not being exactly parallel to each other.

Thus, when the vertical portion 23 of the second base material 20 meets the first flat portion 11 of the first base material 10, a welded area surrounded by the first curved portion 12 and the second curved portion 13 of the first base material 10 and the bent portion 22 of the second base material 20 is formed thereabove.

The bead 30 is formed by molten metal generated when the first base material 10 and the second base material 20 are welded to each other. In the instant case, a shape of the bead 30 is determined depending on a shape of the welded area surrounded by the first curved portion 12 and the second curved portion 13 of the first base material 10 and the bent portion 22 of the second base material 20.

Meanwhile, in various exemplary embodiments of the present invention, to increase a toe angle θc formed by the bead 30, a relation between the offset amount u and a thickness t of the first base material is limited to the following Relational Expression 1.

$$u \geq 0.3 \times t \quad \text{[Relational Expression 1]}$$

That is, the offset amount u is preferably maintained at least 0.3 times relative to the thickness t of the first base material 10 in which the curved portions 12 and 13 are formed. If the offset amount u is less than 0.3 times relative to the thickness t of the first base material 10, the first base material 10 is almost a straight line, and the tow angle θc is not formed as much as desired.

Furthermore, the first curvature R1 of the first curved portion 12 and the second curvature R2 of the second curved portion 13 are limited to the following Relational Expressions 2 and 3, respectively, in relation to the thickness t of the first base material 10.

$$R1 \geq 2 \times t \quad \text{[Relational Expression 2]}$$

$$R2 \geq t \quad \text{[Relational Expression 3]}$$

By limiting the first curvature R1 of the first curved portion 12 and the second curvature R2 of the second curved portion 13 as described above, it is possible to achieve an effect in which the molten metal may be gathered well in the welded area surrounded by the first curved portion 12 and the second curved portion 13 of the first base material 10 and the bent portion 22 of the second base material 20 at the time of welding.

Next, the present invention will be described through Comparative Example and Example.

Comparative Example is a result of the general T-shape flat welding illustrated in FIG. 1, and Example is a result of the T-shape welding according to various exemplary embodiments of the present invention illustrated in FIG. 3.

Cross sections of welded products according to Comparative Example and Example were photographed after being subjected to a single part durability test. The results are illustrated in FIG. 5A and FIG. 5B.

Figure 5A:
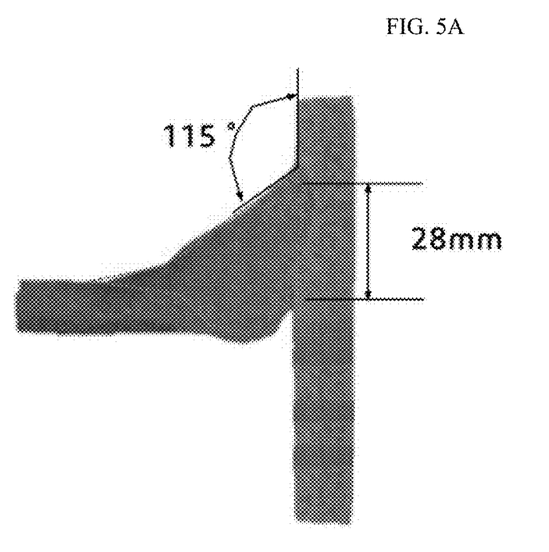
FIG. 5A and FIG. 5B are photographs of cross sections of welded products according to Comparative Example and Example after being subjected to a single part durability test.
Figure 5B:
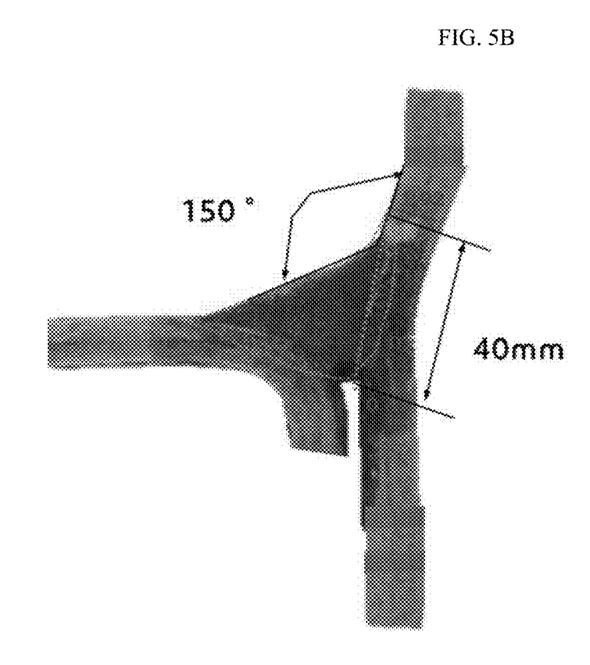

FIG. 5A and FIG. 5B are photographs of the cross sections of the welded products according to Comparative Example and Example after being subjected to the single part durability test.

As seen from FIG. 5A and FIG. 5B, it was confirmed that a toe angle of the bead in Comparative Example was formed at 115°, whereas a tow angle of the bead in Example was formed at 150°.

Furthermore, it was confirmed that the bead in Comparative Example was formed to have a leg length of 28 mm, whereas the bead in Example was formed to have a leg length of 40 mm.

Figure 6A:
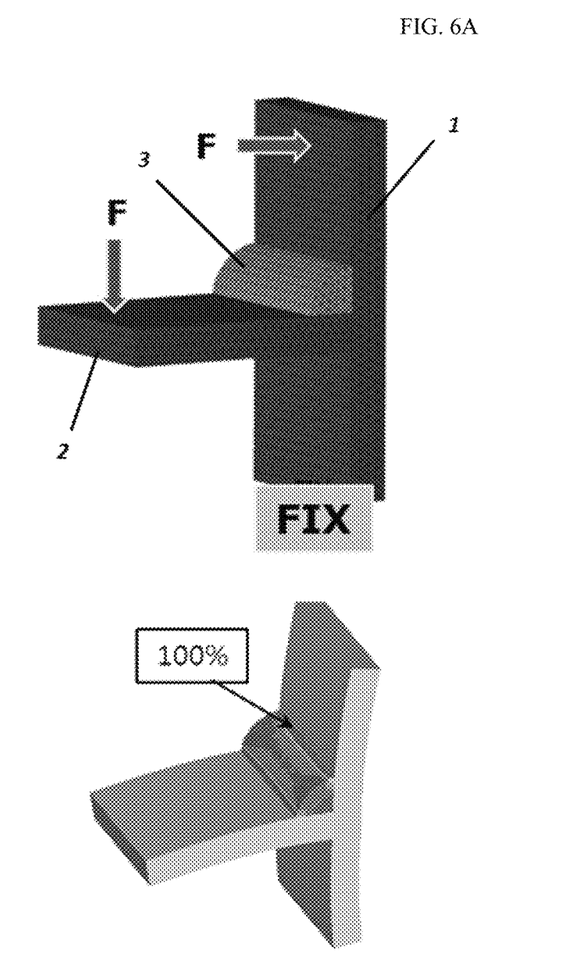
FIG. 6A and FIG. 6B are views illustrating analysis results of stress distribution states of the welded products according to Comparative Example and Example at the time of applying a load for stress comparison to the welded products.
Figure 6B:
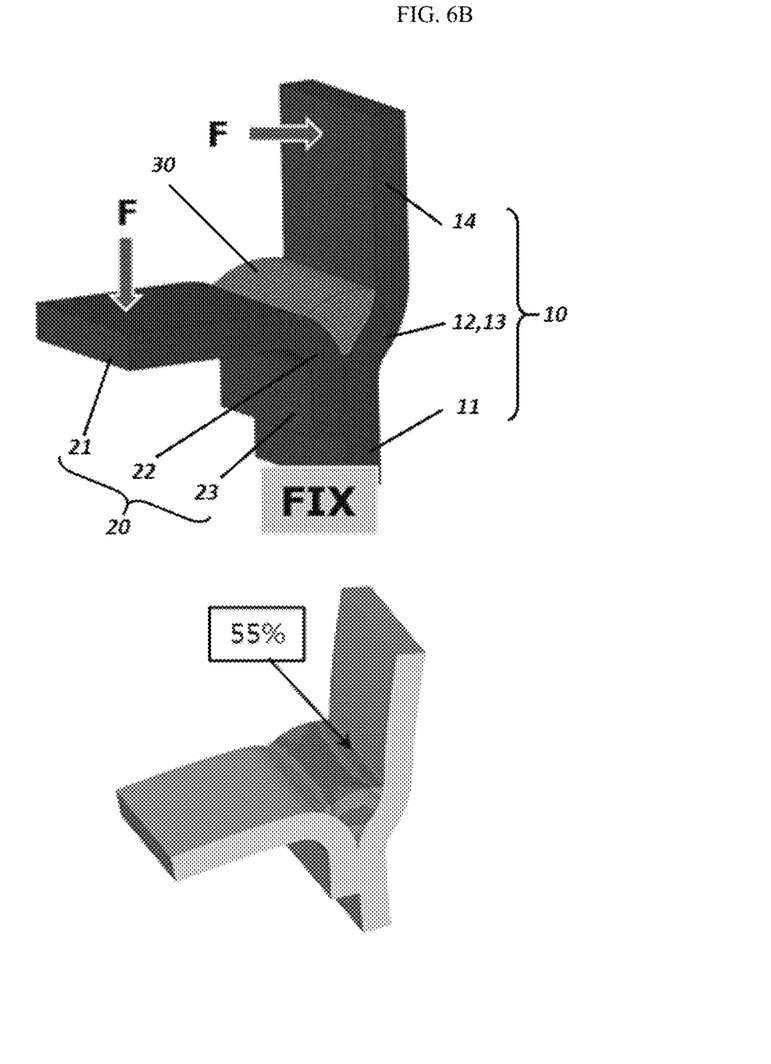

Furthermore, stress distribution states in welded areas of the welded products according to Comparative Example and Example at the time of applying a unit load to the welded areas of the welded products were analyzed for stress comparison. The results are illustrated in FIG. 6A and FIG. 6B.

Here, they were compared concerning a maximum stress when the same load was applied to each of the second flat portion of the first base material and the main body portion of the second base material while the first flat portion of the first base material was fixed. When Comparative Example, which represents a general T-shape welding structure, was set as 100%, it was confirmed that the welding structure according to various exemplary embodiments of the present invention was at a level of 55% when compared to that in Comparative Example. As a result, it was confirmed that the stress concentration in the bead was relieved in Example when compared to that in Comparative Example.

Meanwhile, according to the single part durability test, its lifespan in Comparative Example was 261,000 times, whereas the lifespan in Example increased to 392,000 times.

Here, the single part durability test is done by manufacturing only a part to be inspected and a few surrounding parts thereof configuring a vehicle before an actual vehicle evaluation step in which the complete vehicle is manufactured and evaluated.

Obviously, it requires a considerable amount of cost and time to manufacture the complete vehicle for evaluation of durability. Thus, it is general to manufacture and evaluate a part to be inspected and parts closely related thereto, reducing the cost and the time. Based on the result confirmed in the single part durability test step, the actual vehicle test result is also predictable. The single part durability test is a widely used method not only in the same field but also in the general manufacturing industry.

According to the exemplary embodiment of the present invention, the curved portions are formed in the welded area of the first base material before welding. As a result, when the molten metal flows down under the influence of gravity at the time of welding, the molten metal may be gathered well through the curved portions by the shapes of the curved portions, facilitating the molten metal to be stably introduced into a root portion. Furthermore, the toe angle and the leg length may be increased, relieving the stress concentration in the welded area.

Accordingly, it is expected to increase weldability and durability of the product, improving the quality and marketability of the product.

For convenience in explanation and accurate definition in the appended claims, the terms "upper", "lower", "inner", "outer", "up", "down", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A welding structure of a T-shape welding joint in which a second base material is welded in a T-shape to a first base material, the welding structure comprising:
   the first base material including a first flat portion, a second flat portion, and curved portions formed between the first flat portion and the second flat portion;
   the second base material including a main body portion and a bent portion, wherein the bent portion is formed at an end of the main body portion so that the bent portion is disposed to face the curved portions of the first base material; and
   a bead disposed between the curved portions of the first base material and the bent portion of the second base material,
   wherein the first base material is disposed along a gravitational direction,
   wherein the second base material is disposed in a direction perpendicular to the gravitational direction, and
   wherein the bent portion of the second base material is bent downwardly along the gravitational direction.

2. The welding structure of claim 1, wherein the bent portion of the second base material is bent downwardly with respect to the main body portion.

3. The welding structure of claim 1,
   wherein the second base material has a vertical portion formed from an end of the bent portion to be in parallel to the first base material,
   wherein the first flat portion of the first base material meets the vertical portion of the second base material, and
   wherein the second flat portion extends above the first flat portion with the curved portions intervening between the first flat portion and the second flat portion.

4. The welding structure of claim 3,
   wherein the first flat portion and the second flat portion are formed in parallel to each other while being spaced from each other by a predetermined offset amount u.

5. The welding structure of claim 4, wherein the predetermined offset amount u and a thickness t of the first base material satisfy the following Relational Expression 1:

$$u \geq 0.3 \times t. \quad \text{[Relational Expression 1]}$$

6. The welding structure of claim 3, wherein the curved portions formed in the first base material include:
   a first curved portion extending while being curved from the first flat portion at a first curvature R1;
   a second curved portion extending and connected to the second flat portion while being curved from the first curved portion at a second curvature R2.

7. The welding structure of claim 6, wherein the first curvature R1 of the first curved portion and the second curvature R2 of the second curved portion satisfy the following Relational Expressions 2 and 3, respectively, in relation to a thickness t of the first base material:

$$R1 \geq 2 \times t \quad \text{[Relational Expression 2]}$$

$$R2 \geq t. \quad \text{[Relational Expression 3]}$$

8. The welding structure of claim 6,
   wherein the first curved portion is curved to be convex toward the second base material, and
   wherein the second curved portion is curved to be concave toward the second base material.

9. The welding structure of claim 6,
   wherein the first curved portion is curved to be convex toward the second base material from the first flat portion, and
   wherein the second curved portion is curved from the first flat portion to be concave toward the second base material.

* * * * *